United States Patent
Tsirkin et al.

(10) Patent No.: US 9,721,091 B2
(45) Date of Patent: Aug. 1, 2017

(54) GUEST-DRIVEN HOST EXECUTION

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 99 days.

(21) Appl. No.: 13/407,709

(22) Filed: Feb. 28, 2012

(65) Prior Publication Data

US 2013/0227556 A1 Aug. 29, 2013

(51) Int. Cl.
*G06F 9/455* (2006.01)
*G06F 21/53* (2013.01)

(52) U.S. Cl.
CPC .......... *G06F 21/53* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,615,231 B1 * | 9/2003 | Deen et al. | 709/201 |
| 7,644,410 B1 * | 1/2010 | Graupner et al. | 718/104 |
| 8,171,482 B1 * | 5/2012 | Vlaovic | G06F 8/71 717/148 |
| 8,424,082 B2 * | 4/2013 | Chen et al. | 726/21 |
| 2003/0037089 A1 * | 2/2003 | Cota-Robles et al. | 709/1 |
| 2007/0180448 A1 * | 8/2007 | Low et al. | 718/1 |
| 2008/0155537 A1 * | 6/2008 | Dinda et al. | 718/1 |
| 2008/0201416 A1 * | 8/2008 | Lipton | 709/203 |
| 2010/0161875 A1 * | 6/2010 | Chang et al. | 711/6 |
| 2010/0306764 A1 * | 12/2010 | Khanna | 718/1 |
| 2011/0022817 A1 * | 1/2011 | Gaster et al. | 711/202 |
| 2011/0050712 A1 * | 3/2011 | Jackson | 345/503 |
| 2011/0054879 A1 * | 3/2011 | Bogsanyl et al. | 703/23 |
| 2013/0086299 A1 * | 4/2013 | Epstein | G06F 12/1475 711/6 |

\* cited by examiner

*Primary Examiner* — Lewis A Bullock, Jr.
*Assistant Examiner* — Wynuel Aquino
(74) *Attorney, Agent, or Firm* — Lowenstein Sandler LLP

(57) ABSTRACT

A system and method by which a host computer system can run executables on behalf of a virtual machine (VM) are disclosed. In accordance with one embodiment, an executable of a guest application of a virtual machine is received by a hypervisor and is run via the host operating system on behalf of the virtual machine.

8 Claims, 4 Drawing Sheets

GUEST-DRIVEN HOST EXECUTION

TECHNICAL FIELD

This disclosure relates to computer systems, and more particularly, to hibernation in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
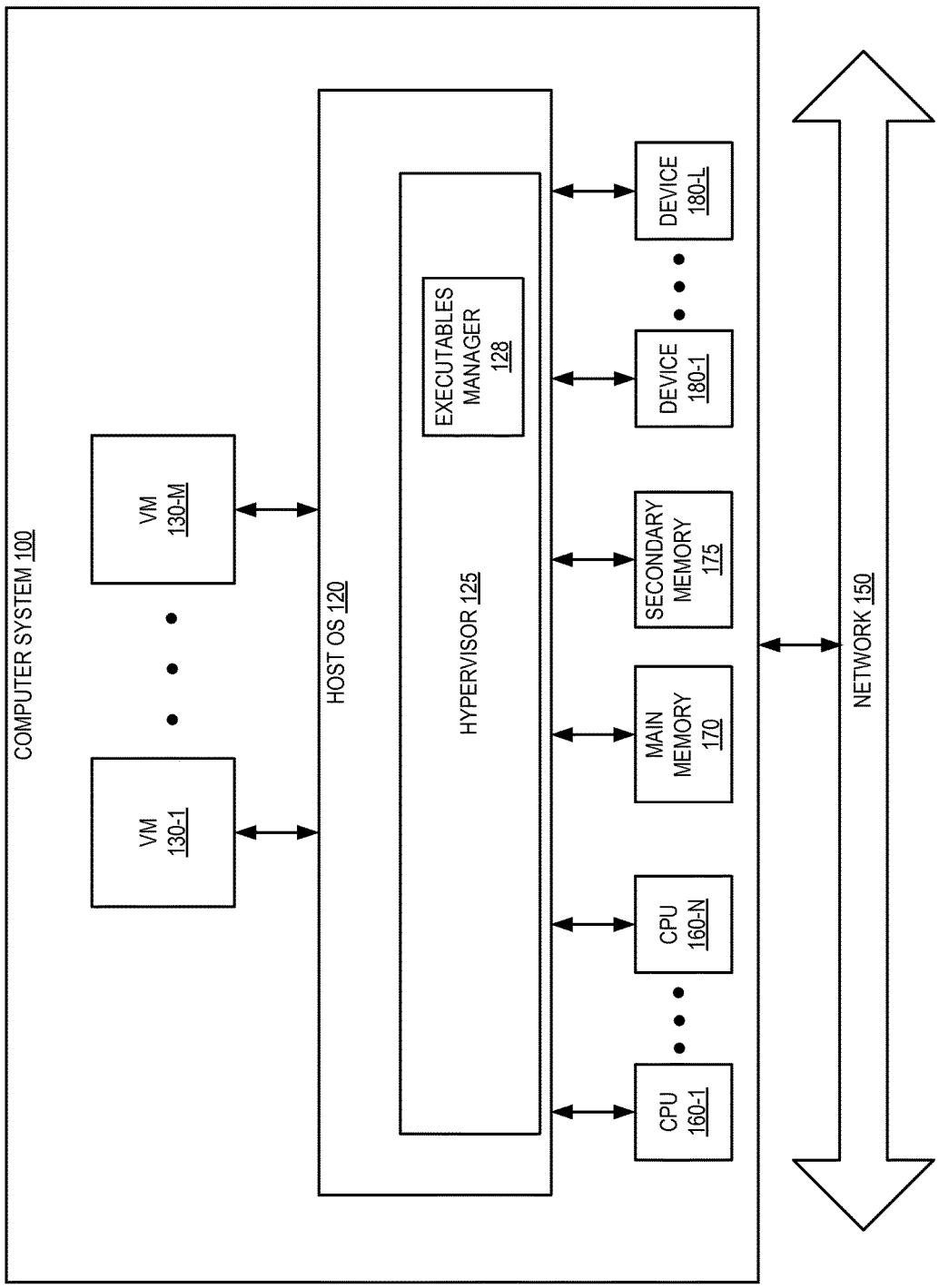
FIG. 1 depicts an exemplary computer system architecture, in accordance with an embodiment of the present invention.

Described herein is a mechanism by which a host computer system can run executables on behalf of a virtual machine. In accordance with embodiments of the present invention, a virtual machine may upload an executable of a program intended to be run in the virtual machine to the host via the guest operating system. The executable is then received by the hypervisor, and verified by the host operating system. If the verification is successful, the executable is run via the host operating system.

Advantageously, a number of features may be incorporated into embodiments of the present invention to improve security. For example, the executable may be run via the host operating system in a limited environment, thereby preventing a malicious executable, or an executable that has been tampered with, from inflicting damage on the host system. In addition, the host operating system may validate that commands of the executable are authorized for the virtual machine that uploaded the executable, prior to executing the commands.

In one embodiment, additional features may also be provided to enhance the utility of the system. In particular, the executable may be run by the host operating system in response to an external event, such as an incoming packet, rather than being run immediately after verification. In addition, the hypervisor may perform one or more actions after an executable is run (e.g., forwarding a packet, discarding a packet, awakening a virtual machine, etc.), possibly based on a result returned by the executable, and may pass this result back to the virtual machine for further processing.

Embodiments of the present invention thus enable a host computer to run executables on behalf of virtual machines in a secure and flexible manner. This facility is particularly advantageous for executables that can make use of hardware resources unavailable to a virtual machine (e.g., a ray-tracing executable that may offload rendering computations to a graphics processing unit [GPU] or graphics accelerator card, etc.).

Moreover, embodiments of the present invention may be used to run executables in a more efficient manner than from inside a virtual machine. For example, an executable that filters packets directed to a virtual machine may, when run, result in long idle periods for the virtual machine. In such situations, running the executable via the host operating system may allow a hibernation mechanism to put the virtual machine to sleep, thereby preserving CPU cycles for other virtual machines and host processes.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "executing", "running", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160, main memory 170, which may include volatile memory devices (e.g., random access memory (RAM)), non-volatile memory devices (e.g., flash memory), and/or other types of memory devices, secondary memory 175 (e.g., one or more hard disk drives, solid-state drives, etc.), and one or more devices 180 (e.g., a network interface device, a CD-ROM drive, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-M and that manages the execution of these virtual machines. In accordance with this embodiment, hypervisor 125 may include an executables manager 128 that is capable of receiving an executable from a virtual machine 130, of instructing computer system 100 to verify the executable and, upon successful verification, of receiving a result returned by the executable, of performing one or more actions based on the returned result, and of passing the result back to the virtual machine, as described below with respect to FIG. 3. It should be noted that in some alternative embodiments, hypervisor 125 may be external to host OS 120, rather than embedded within host OS 120.

Each virtual machine (VM) 130 is a software implementation of a machine that executes programs as though it were an actual physical machine. Virtual machine (VM) 130 is described in more detail below with respect to FIG. 2.

Figure 2:
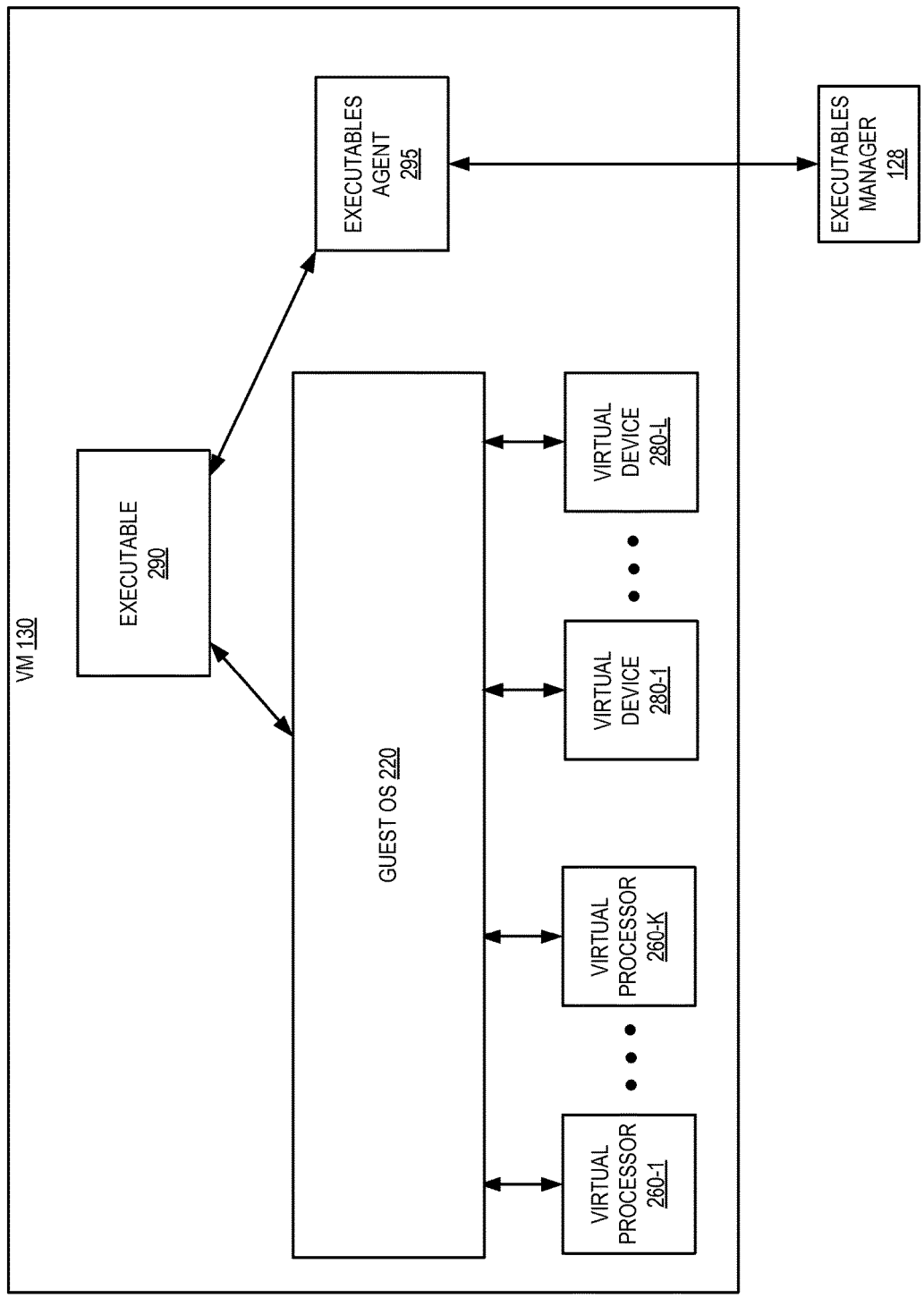
FIG. 2 depicts a block diagram of the salient elements of a virtual machine, in accordance with an embodiment of the present invention.

FIG. 2 depicts a block diagram of the salient elements of virtual machine (VM) 130, in accordance with an embodiment of the present invention. As shown in FIG. 2, virtual machine 130 comprises a guest operating system (OS) 220, one or more virtual processors 260, one or more virtual devices 280, and a sleep-handling module 290.

Guest operating system (OS) 220 is software that manages computer resources and provides functions such as interprocess communication, scheduling, memory management, and so forth. Each virtual processor 260 is software that emulates a physical processor, and that maps to one of central processing units (CPU) 160, possibly in a many-to-one fashion. It should be noted that the number of virtual processors may or may not be the same as the number of CPUs (i.e., K may or may not equal N).

Each virtual device 280 is software that emulates a physical device and that maps to one of devices 180. In one embodiment, the mapping between virtual devices 280 and devices 180 is one-to-one, while in some other embodiments, the number of virtual devices 280 may not be the same as the number of devices 180, and/or the mapping may not be one-to-one. In one embodiment, hypervisor 125 manages these mappings in a transparent fashion, so that guest OS 220 and applications executing on virtual machine 130 interact with virtual processors 260 and virtual devices 280 as though they were actual physical entities.

Executable 290 is an executable of an application intended to be run in the virtual machine 130 using the guest operating system 220 (i.e., an executable of a guest application of the virtual machine 130). In some embodiments executable 290 might be binary machine-code, while in some other embodiments executable 290 might contain higher-level instructions (e.g., Java bytecode, assembly language statements, etc.) that can be interpreted at runtime into binary code. Moreover, in some embodiments executable 290 might access a hardware resource of computer system 100 that is not accessible to virtual machine 130 (e.g., a graphics accelerator card [not depicted in FIG. 1], etc.).

In one embodiment, the virtual machine may include an executables agent 295 that cooperates with the executables manager 128 of hypervisor 125 to ensure that running executable 290 would not compromise security of the virtual machine 130 and/or the computer system 100. In particular, the executables agent 295 provides executable 290 to the hypervisor 125 to be executed by the host computer system 100 on behalf of the virtual machine and to return the execution result to the executables agent. Alternatively, prior to running executable 290 in the virtual machine 130, executables agent 295 may provides executable 290 to the hypervisor 125 for verification and wait for a message from hypervisor 125 indicating whether executable 290 should or should not be allowed to run in the virtual machine 130. It should be noted that in some other embodiments, executables agent 295 may be part of guest OS 220, rather than external to guest OS 220, as depicted in FIG. 2.

Figure 3:
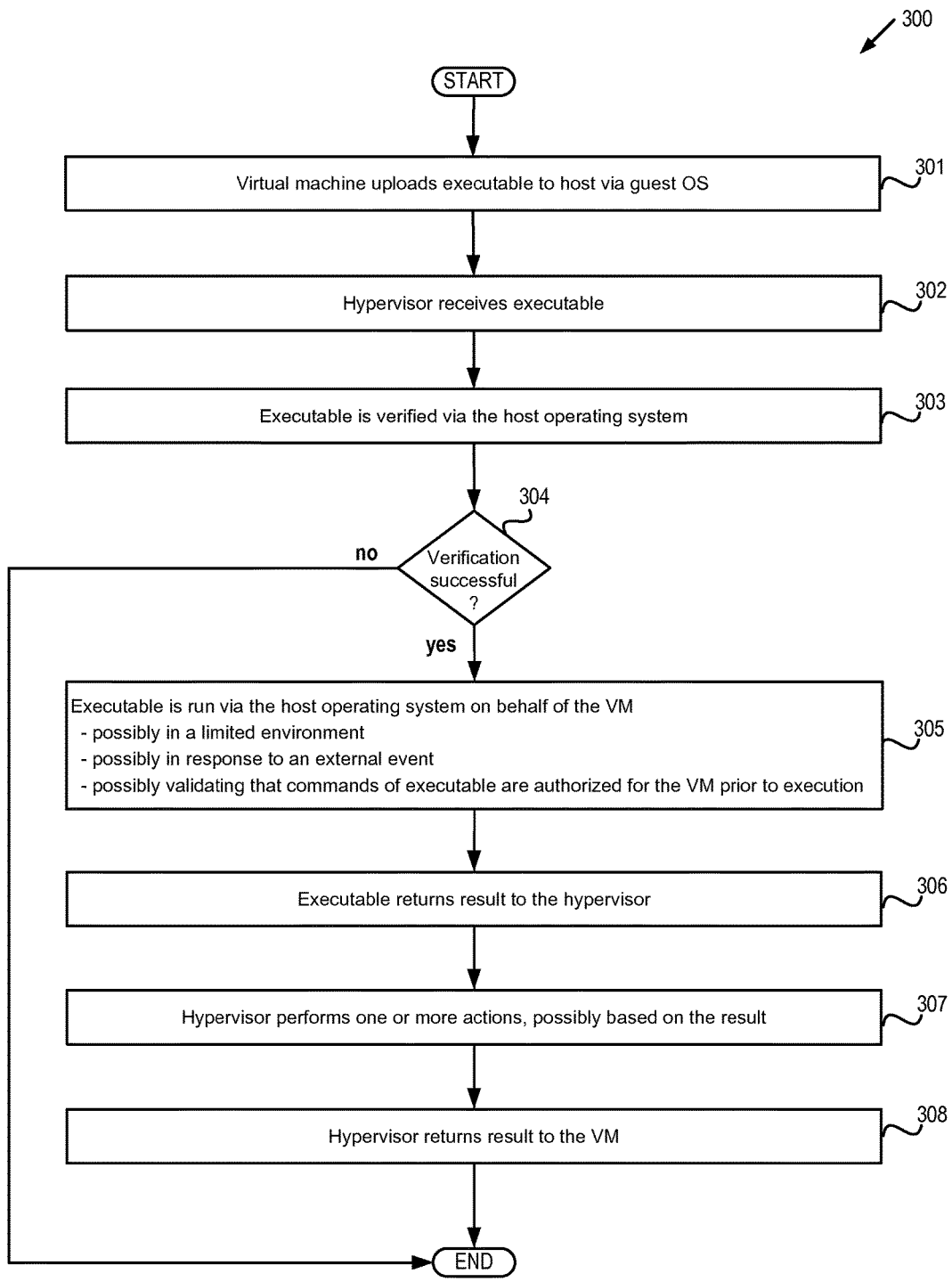
FIG. 3 depicts a flow diagram of one embodiment of a method by which an executable may be run by a host on behalf of a virtual machine.

FIG. 3 depicts a flow diagram of one embodiment of a method 300 by which an executable may be run by a host on behalf of a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1 (e.g., one or more of host OS 120, hypervisor 125, executables manager 128, guest OS 220, executables agent 295, etc.), while in some other embodiments, some or all of the method might be performed by another machine. It should be noted that blocks depicted in FIG. 3 can be performed simultaneously or in a different order than that depicted.

At block 301, a virtual machine 130 uploads an executable (e.g., executable 290, etc.) of a guest application to host computer system 100 via guest operating system 220. The executable may be binary machine-code, or may comprise higher-level instructions that can be interpreted at runtime into binary code (e.g., Java bytecode, assembly language statements, etc.). The executable may also access a hardware resource of computer system 100 that is not accessible to virtual machine 130 (e.g., a graphics accelerator card [not depicted in FIG. 1], etc.). Examples of executables that may be uploaded at block 301 may include Berkeley Packet Filter bytecode, OpenCL-based executables, or any other type of executable that can be run by CPUs 160.

At block 302, hypervisor 125 receives the executable from the virtual machine.

At block 303, host operating system 120 verifies the executable (e.g., checks that the executable does not contain any illegal instructions, etc.) It should be noted that block 303 is optional, and that some alternative embodiments may omit this block.

Block 304 branches based on the result of the verification of block 303 (if block 303 was in fact performed). If the verification was successful, execution proceeds to block 304, otherwise execution of the method terminates.

At block 305, the executable is run via host operating system 120 on behalf of the virtual machine, possibly. In some embodiments, the executable may be run in a limited environment (e.g., a "sandbox" in which access to one or more operations or resources are prohibited, etc.), while in some other embodiments the executable may be run in normal fashion. It should be noted that the running of the executable at block 305 might occur as soon as it has been uploaded and verified, or in response to an event (e.g., an event external to the hypervisor, such as the arrival of an incoming Internet Protocol packet, etc.), or based on some other criterion (e.g., a fixed time delay, etc.). It should also be noted that when the executable is run, the host operating system 120 might validate whether one or more commands of the executable are authorized for the virtual machine, prior to execution of the commands. In some such embodiments, the authorized commands may be defined by a policy in the hypervisor (e.g., a policy that ensures that the hypervisor and the host cannot be compromised by the authorized commands, a policy that allows any command that is allowed for the virtual machine, a policy that allows access to a device that is not accessible to the virtual machine, etc.).

At block 306, the executable returns a result to hypervisor 125, such as an error code, a filename, a filter-matching result for a filter (e.g., a Berkeley Packet Filter, etc.), a processed version of an input to the executable (e.g., a compressed version of the input, etc.), and so forth. It should be noted that block 306 is optional, as some executables, when run, may not necessarily return any values.

At block 307, hypervisor 125 performs one or more actions, possibly based on the result returned at block 306 (if a result was in fact returned). Such actions may include forwarding an incoming packet, discarding an incoming packet, awakening a hibernating virtual machine, discarding a message that is for notifying the virtual machine about a hardware event (e.g., an interrupt, etc.), and so forth. It should be noted that block 307 is optional, and that some alternative embodiments may omit this block.

At block 308, hypervisor 125 returns the result back to the virtual machine (if a result was in fact returned at block 306). It should be noted that block 308 is optional, and that some alternative embodiments may omit this block.

Figure 4:
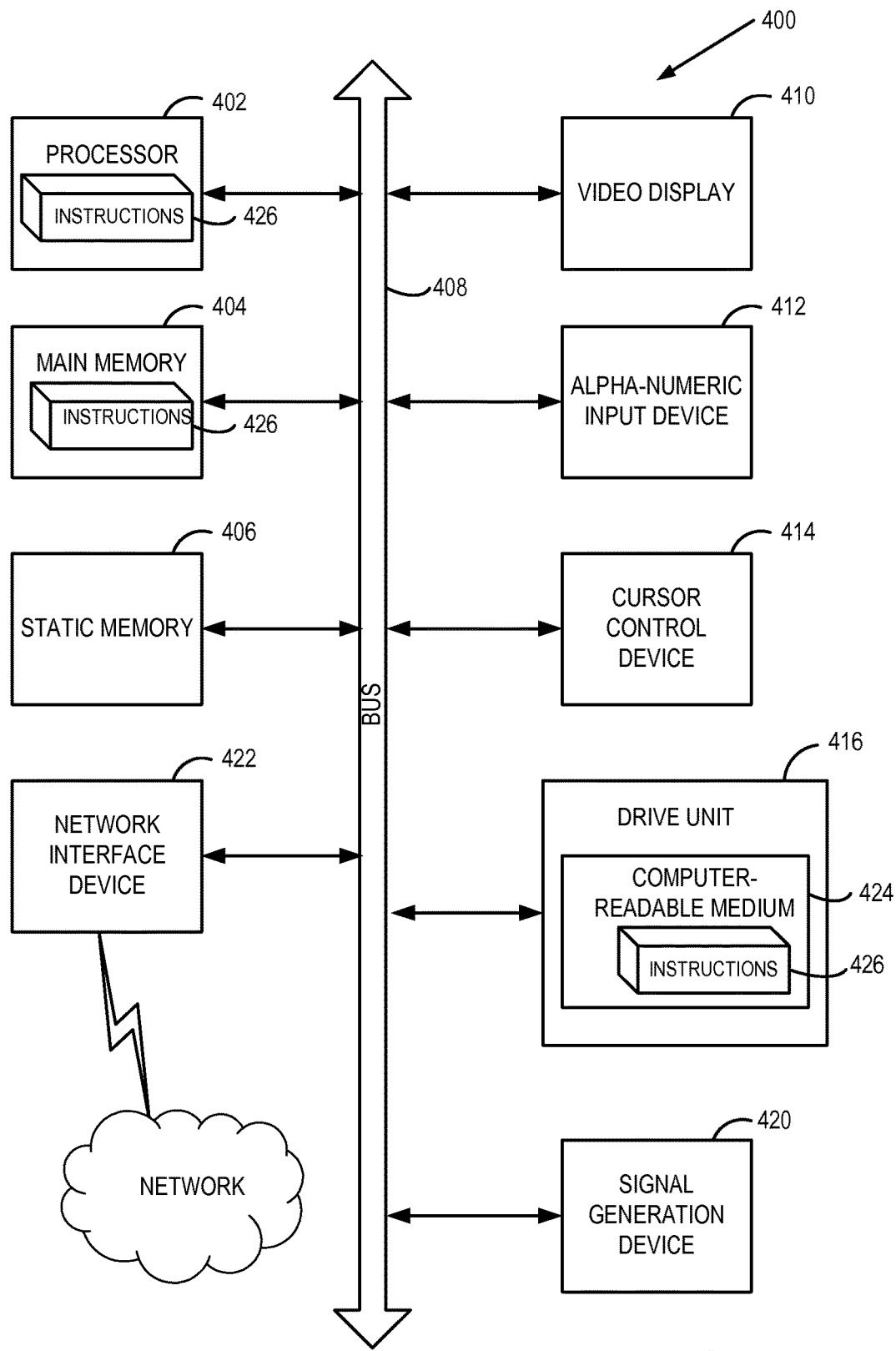
FIG. 4 depicts a block diagram of an illustrative computer system operating in accordance with embodiments of the invention.

FIG. 4 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    a memory;
    a processor coupled to the memory;
    a host operating system, executed by the processor from the memory; and
    a hypervisor, communicatively coupled to the host operating system, to:
    manage one or more virtual machines running on top of the host operating system, each of the one or more virtual machines having a respective guest operating system to run one or more guest applications;
    receive, from a first virtual machine of the one or more virtual machines, an executable of a guest application of the first virtual machine, wherein the executable of the guest application was installed to run via a guest operating system of the first virtual machine, and wherein the executable comprises a binary machine code for the guest application of the first virtual machine,
    validate that commands of the executable are authorized for the first virtual machine,
    in response to an arrival of a network packet and a validation that the commands of the executable are authorized for the first virtual machine, run, via the host operating system, the executable on behalf of the first virtual machine, wherein running the executable via the host operating system comprises causing the first virtual machine to be placed into a sleep mode,
    in view of a result returned by the executable, perform operations comprising:
    causing awakening of the first virtual machine, and
    discarding the network packet, and
    pass, by the hypervisor, the result returned by the executable to the first virtual machine of the one or more virtual machines.

2. The apparatus of claim 1 wherein the hypervisor is also to verify the executable.

3. The apparatus of claim 1 further comprising a hardware resource that is not available to the first virtual machine.

4. The apparatus of claim 1 wherein the running of the executable on behalf of the first virtual machine prevents the guest application from compromising security of the first virtual machine.

5. A method comprising:
    managing, by a processing device of a computer system hosting a hypervisor and one or more virtual machines, the one or more virtual machines running on top of a host operating system of the computer system, each of the one or more virtual machines having a respective guest operating system to run one or more guest applications;
    receiving, from a first virtual machine of the one or more virtual machines by the hypervisor, an executable of a guest application of the first virtual machine, wherein the executable of the guest application was installed to run via a guest operating system of the first virtual machine, and wherein the executable comprises a binary machine code for the guest application of the first virtual machine;
    validating that commands of the executable are authorized for the first virtual machine;
    in response to an arrival of a network packet and a validation that the commands of the executable are authorized for the first virtual machine, running, via the host operating system, the executable on behalf of the first virtual machine, wherein running the executable via the host operating system comprises causing the first virtual machine to be placed into a sleep mode;
    in view of a result returned by the executable, performing operations comprising:
    causing awakening of the first virtual machine, and
    discarding the network packet; and
    passing, by the hypervisor, the result returned by the executable to the first virtual machine of the one or more virtual machines.

6. A non-transitory computer readable storage medium having instructions encoded thereon which, when executed by a computer system, cause the computer system to perform operations comprising:
    managing, by a hypervisor hosted by the computer system, one or more virtual machines running on top of a host operating system of the computer system, each of the one or more virtual machines having a respective guest operating system to run one or more guest applications;

receiving, from a first virtual machine of the one or more virtual machines by hypervisor, an executable of a guest application of the first virtual machine, wherein the executable of the guest application was installed to run via a guest operating system of the first virtual machine, and wherein the executable comprises a binary machine code for the guest application of the first virtual machine;

validating that commands of the executable are authorized for the first virtual machine;

in response to an arrival of a network packet and a validation that the commands of the executable are authorized for the first virtual machine, running, via the host operating system, the executable on behalf of the first virtual machine, wherein running the executable via the host operating system comprises causing the first virtual machine to be placed into a sleep mode;

in view of a result returned by the executable, performing operations comprising:

causing awakening of the first virtual machine, and discarding the network packet; and passing, by the hypervisor, the result returned by the executable to the first virtual machine of the one or more virtual machines.

7. The non-transitory computer readable storage medium of claim 6, wherein the hypervisor is also to verify the executable.

8. The non-transitory computer readable storage medium of claim 6, further comprising a hardware resource that is not available to the first virtual machine.

* * * * *